July 24, 1923.
C. C. FARMER
TRIPLE VALVE DEVICE
Filed June 27, 1921
1,463,039
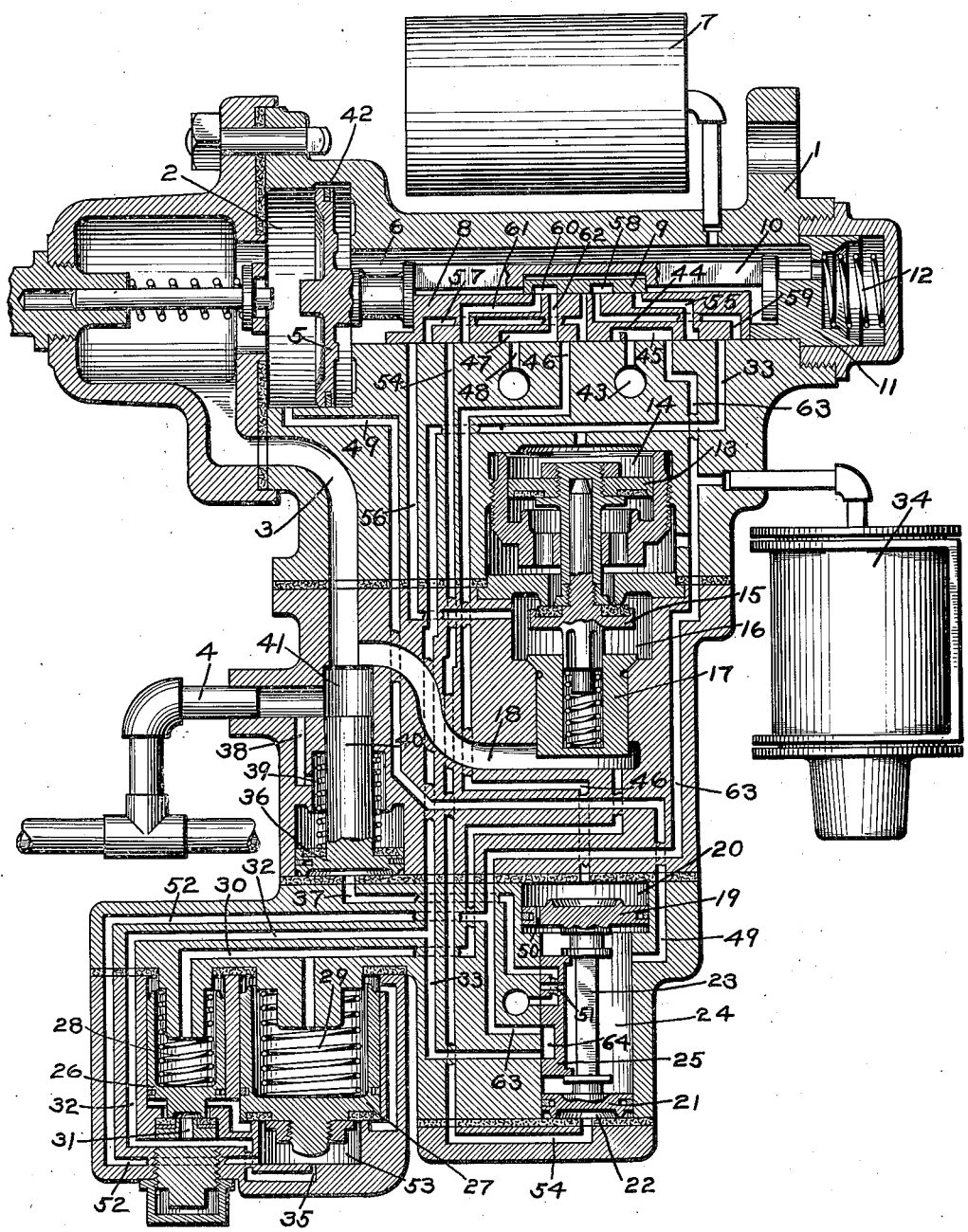
INVENTOR
CLYDE C. FARMER
BY Wm. M. Cady
ATTORNEY Patented July 24, 1923.

1,463,039

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRIPLE-VALVE DEVICE.

Application filed June 27, 1921. Serial No. 480,705.

*To all whom it may concern:*

Be it known that I, CLYDE C. FARMER, a citizen of the United States, residing at Pittsburgh, in the county of Allegheny and State of Pennsylvania, have invented new and useful Improvements in Triple-Valve Devices, of which the following is a specification.

This invention relates to fluid pressure brakes, and more particularly to a triple valve device.

While the well known quick serial action feature of a triple valve device operates in an emergency application of the brakes to secure a more rapid and more nearly simultaneous application of the brakes throughout the train on trains of ordinary length, on very long freight trains, such as are now frequently operated, the brakes may be applied with force at the head end of the train in an emergency application, before the brakes are more than lightly applied at the extreme rear of the train. This may result in the running in of the slack and the production of undesirable shocks.

It has heretofore been proposed to overcome the above difficulty. By providing means for delaying or retarding the build-up of pressure in the brake cylinder in an emergency application of the brakes, so as to secure a more nearly simultaneous application of the brakes throughout the train, such for example, as the construction shown in the prior patent of Walter V. Turner, No. 1,309,788, dated July 15, 1919.

While a construction of the character shown in the above mentioned patent will operate satisfactorily to accomplish the desired result, it may happen that a train may be made up of some triple valves having the retarded emergency feature and other triple valves not having this feature and if the retarded emergency triple valves should happen to be at the rear of the train, then when an emergency application of the brakes is made, the brakes would be applied at the usual emergency rate at the head end of the train, while the emergency action is retarded by the operation of the retarded emergency triple valves at the rear of the train, with the result that the slack would still be liable to run in and cause disastrous shocks.

The principal object of the present invention is to overcome the above difficulty.

In the accompanying drawing, the single figure is a central sectional view of a triple valve device embodying my invention.

In the well known retarded release triple valve device, when the brake pipe pressure is increased to effect the release of the brakes, the more rapid increase in brake pipe pressure at the head end of the train causes the triple valve parts to be moved to a position in which the release of fluid from the brake cylinder is restricted, while on cars at the rear of the train, where the rate of increase in brake pipe pressure is more gradual, the triple valve parts move to a position in which a more rapid exhaust of fluid from the brake cylinder is effected.

The above feature of the retarded release triple is herein utilized to provide means for retarding the rate of build up of pressure in an emergency application of the brakes on the cars at the head end of the train while permitting the usual rate of increase in brake cylinder pressure on cars at the rear end of the train.

The triple valve construction may comprise a casing 1, having a piston chamber 2, connected by passage 3 to the brake pipe 4 and containing piston 5, and a valve chamber 6, connected to the auxiliary reservoir 7, and containing a main slide valve 8, and a graduating slide valve 9, adapted to be operated by piston 5.

Acting on the slide valve 8 and piston stem 10, is a yielding stop member 11, subject to the pressure of a spring 12, for controlling the retarded release action of the triple valve device.

The triple valve casing 1 also contains the usual quick action valve mechanism comprising a piston 13, contained in piston chamber 14, a vent valve 15, contained in valve chamber 16 and adapted to be operated by piston 13, and a check valve 17, for preventing back flow from valve chamber 16 to the brake pipe passage 18.

According to my invention, a valve device is provided comprising a differential piston having a larger piston head 19 contained in piston chamber 20, and the other piston head 21, contained in piston chamber 22 and connected to piston head 19 by a stem 23.

The valve chamber 24, intermediate the piston heads 19 and 21, contains a slide valve 25, adapted to be operated by the differential piston.

Also contained in the triple valve casing are valve pistons 26 and 27, subject on one side to the pressure of the respective springs 28 and 29 and to brake pipe pressure supplied thereto through a passage 30, and having the seated area of valve piston 26 connected through a large port 31 with a passage 32, which leads to a passage 33, through which fluid is supplied by the triple valve to the brake cylinder 34. The seated area of the valve piston 27 is also connected to the passage 32 through a restricted passage 35.

For restricting the flow of fluid from the brake pipe to the brake cylinder in an emergency application of the brakes under certain conditions, a piston 36 is provided, having one side connected to a passage 37, leading to the seat of slide valve 25 and subject on the opposite side to brake pipe pressure supplied through passage 38, and to the pressure of a spring 39.

The piston 36 operates a stem 40, which is adapted, when operated by the piston, to loosely fill a recess 41, and thereby restrict communication from the brake pipe 4 to the passage 18.

In operation, fluid supplied to the brake pipe 4 flows through passage 3 of the triple valve device to piston chamber 2, and thence through the usual feed groove 42 around piston 5 to valve chamber 6, charging the auxiliary reservoir 7 in the usual manner.

When the brakes are released after an application of the brakes by increasing the brake pipe pressure, the triple valve pistons 5 on the triples at the head end of a train, or all the triples on a short train, are shifted to the retarded release position by the rapid increase in brake pipe pressure.

In this position, the main slide valve 8 is shifted, so that brake cylinder passage 63 is connected to the exhaust port 43 through a restricted port 44 of the exhaust cavity 45, the exhaust of fluid from the brake cylinder being thereby retarded.

A passage 46, leading to piston chamber 20 is also connected by a cavity 47 in slide valve 8 with an exhaust port 48. Since the valve chamber 24 is supplied with fluid at brake pipe pressure through passage 49, the venting of fluid from piston chamber 20, which had previously equalized into said chamber, through the restricted port 50, causes the movement of the differential piston to its upper position. The differential piston will then remain in the upper position since fluid pressure equalizing from valve chamber 24 through port 50 can only act on the small area of the piston head 19 outside of the seat, while the full area of the opposite side of the piston is subject to fluid pressure in the valve chamber 24.

In this position, communication from passage 33 to passage 63 is cut off by the slide valve 25, while a port 51, through the slide valve, registers with passage 37, so that fluid at brake pipe pressure is supplied to the piston 36. The piston 36 will not be shifted at this time, however, since the brake pipe pressure and the spring 39 acting on the opposite side of the piston will prevent movement.

If, however, the brake pipe pressure is suddenly reduced to effect an emergency application of the brakes, with the parts in the above described positions, the triple valve piston 5 will shift the main slide valve 8 and the graduating valve 9 to emergency position in which the passage 33, through which fluid is supplied to the brake cylinder, is uncovered. Fluid then flows from the auxiliary reservoir 7 to passage 33, but since direct communication from passage 33 to passage 63 is cut off by the slide valve 25, fluid can only flow from passage 33 to passage 32.

Fluid under pressure also flows from passage 33 to quick action piston chamber 14 and causes the movement of piston 13 so as to open the vent valve 15 and permit the venting of fluid from the brake pipe to the brake cylinder.

The movement of the triple valve piston 5 to emergency position connects passage 49 with the auxiliary reservoir side of the piston 5, so that fluid at auxiliary reservoir pressure is now supplied to valve chamber 24 and through port 51 to piston 36 and since the brake pipe pressure on the opposite side of the piston has been reduced, the piston 36 will shift the stem 40 so as to engage in the recess 41 and thereby restrict the flow of fluid from the brake pipe to the brake cylinder past the quick action vent valve 15.

Fluid vented from the brake pipe to the brake cylinder also flows through passage 63 and passage 52 to the chamber 53 below the valve piston 27, but if the normal brake pipe pressure carried is the ordinary low standard pressure of 70 pounds, the build up of brake cylinder pressure and pressure in chamber 53 is not sufficient to effect the movement of the valve piston 27 from its seat. However, fluid from the auxiliary reservoir flows through passage 32 and the restricted port 35 to chamber 53 and thence through passage 52 to the brake cylinder, so that the brake cylinder pressure is slowly increased.

When the pressure in chamber 53 as supplied from the auxiliary reservoir to the brake cylinder has increased to a predetermined degree, say about 30 pounds, the valve piston 27 will be shifted so as to admit fluid to the outer seated area of the valve piston 26. The valve piston 26 is then immediately shifted to its outer position, in which fluid can flow from the auxiliary reservoir through passage 32 and the large port 31 to chamber 53 and thence through passage 52 to the brake cylinder and thenceforth the brake cylinder pressure is rapidly increased.

If, as in high speed train service, a high brake pipe pressure, say 110 pounds is normally carried, the increase in brake cylinder pressure by flow from the brake pipe to the brake cylinder when the vent valve 15 is opened in an emergency application of the brakes, is such that the pressure in chamber 53 is quickly increased to a point sufficient to effect the opening movement of the valve piston 27, so as to permit the prompt and rapid build up of brake cylinder pressure.

In other words, when a high brake pipe pressure is carried in the system, the retarded emergency feature is practically cut out of action and the usual quick emergency build up of brake cylinder pressure is secured.

The above operation obtains at the head end of the train on triple valves equipped with my improvement, but on cars at the rear of the train, if the train is long, the triple valve pistons only move back to full release position in releasing the brakes, this position being the one shown in the drawing.

In this position of the triple valve parts, it will be noted that both the passage 46 leading to the piston chamber 20 and the passage 54 leading to chamber 22 are blanked at the main slide valve 8, so that the position of the differential piston is not influenced in this position by the triple valve.

In order to ensure that the differential piston will be in the position shown even if the triple valve parts happen to have been in the retarded release position, as where a car has been shifted from the front to the rear of the train, means are provided for positively effecting the movement of the differential piston to its lower position when the triple valve parts move to service lap position after a service application of the brakes.

Upon movement of the triple valve parts to service application position, the service port 55 in the main slide valve 8 registers with passage 63, and being uncovered by the movement of the graduating valve 9, fluid is supplied from the auxiliary reservoir to the brake cylinder in the usual manner. Quick service is also effected by venting fluid from the brake pipe through passage 56, port 57 in slide valve 8, cavity 58 in graduating valve 9, and port 59 to passage 33 and thence to the brake cylinder as will now be described.

In service position, an extension of port 57 registers with passage 46, so that fluid from the brake pipe is also supplied to the seated area of piston head 19.

When the graduating valve 9 is moved back to service lap position, cavity 60 therein connects port 61 with port 62 opening into cavity 47 and since cavity 47 still registers with exhaust port 48 and port 61 with passage 54, the chamber 22 below piston 21 is connected to the atmosphere so that the differential piston device will be shifted to its lower position, as shown in the drawing.

It will now be apparent that on the cars at the rear of the train, the differential piston device will be in its lower position in which a direct communication is made from the passage 33, through cavity 64 in slide valve 25 to passage 63, so that when an emergency application of the brakes is made, fluid under pressure will be supplied through large ports to the brake cylinder to effect an emergency application at the usual rate, the retarded emergency feature being cut out of operation.

In starting out on a trip, the brakes are usually applied and released before starting to test out the equipment and consequently, when the brakes are applied, the triple valve devices moving to service lap position, any differential piston device which may have been in the upper position will be shifted to its lower position, as hereinbefore described. When the brakes are released, the triple valves at the head end of the train move to the retarded release position, thereby effecting the movement of the differential piston devices at the head end to the upper position, while the differential piston devices at the rear of the train remain in their lower positions. It will therefore be clear that if an emergency application of the brakes is effected, the emergency application will be retarded on cars at the head end of the train, while the brake cylinder pressure on cars at the rear end will be built up at the usual emergency rate.

Having now described my invention, what I claim as new and desire to secure by Letters Patent, is:—

1. In a fluid pressure brake, the combination with a brake pipe, of a valve mechanism for retarding an emergency application of the brakes and means operated upon an increase in brake pipe pressure for controlling said valve mechanism.

2. In a fluid pressure brake, the combination with a brake pipe, of a valve mechanism for retarding an emergency application of the brakes and means operated upon an increase in brake pipe pressure for cutting said valve mechanism into operation.

3. In a fluid pressure brake, the combination with a brake pipe, of a valve mechanism for retarding an emergency application of the brakes and means operated according to the rate of increase in brake pipe pressure for determining whether said valve mechanism will be cut in or cut out of operation.

4. In a fluid pressure brake, the combination with a brake pipe, of a valve mechanism for retarding an emergency application of the brakes and means operated upon an increase in brake pipe pressure at a predetermined rate for cutting said valve mechanism into operation and upon an increase in brake pipe pressure at a lesser rate for cutting said valve mechanism out of operation.

5. In a fluid pressure brake, the combination with a triple valve device having a release position in which the release of the brakes is retarded, of a valve mechanism for retarding an emergency application of the brakes and means operative upon movement of the triple valve device to the retarded release position for cutting said valve mechanism into operation.

6. In a fluid pressure brake, the combination with a triple valve device having a normal release position and a position in which the release of the brakes is retarded, of a valve mechanism for retarding an emergency application of the brakes and means operative upon movement of the triple valve device to the retarded release position for cutting said valve mechanism into operation.

7. In a fluid pressure brake, the combination with a triple valve device for effecting a service application of the brakes, of means for retarding an emergency application of the brakes and a valve device operative upon movement of the triple valve device in effecting a service application of the brakes for cutting said means out of operation.

8. In a fluid pressure brake, the combination with a triple valve device having a service lap position, of means for retarding an emergency application of the brakes and a valve device operative upon movement of the triple valve device to service lap position for cutting said means out of operation.

9. In a fluid pressure brake, the combination with a triple valve device for controlling the application and release of the brakes and having a service lap position and a position in which the release of the brakes is retarded, of means for retarding an emergency application of the brakes and a valve device operative upon movement of the triple valve device to the retarded release position for cutting said means into operation and upon movement to service lap position for cutting said means out of operation.

10. In a fluid pressure brake, the combination with a brake pipe, of a valve mechanism for retarding an emergency application of the brakes, a valve device having a position for cutting said valve mechanism into operation and a position for cutting said valve mechanism out of operation, and means operated upon an increase in brake pipe pressure for effecting the movement of said valve device to the cut-in position and upon a reduction in brake pipe pressure for effecting the movement of said valve device to the cut out position.

11. In a fluid pressure brake, the combination with a brake cylinder and a triple valve device, of a valve mechanism for regulating the rate of flow of fluid from the triple valve device to the brake cylinder in an emergency application of the brakes and a valve device controlled by the triple valve device for also controlling a communication through which fluid is supplied from the triple valve device to the brake cylinder.

12. In a fluid pressure brake, the combination with a brake cylinder and a triple valve device for controlling the supply of fluid to the brake cylinder in an emergency application of the brakes, of a valve mechanism for controlling ports through which fluid is supplied from the triple valve device to the brake cylinder in an emergency application of the brakes and a valve device operative upon movement of the triple valve device to one position for establishing a direct communication from the triple valve device to the brake cylinder through which fluid is supplied to the brake cylinder in an emergency application of the brakes.

13. In a fluid pressure brake, the combination with a brake cylinder and a triple valve device for controlling the supply of fluid to the brake cylinder in an emergency application of the brakes, of a valve mechanism for controlling ports through which fluid is supplied from the triple valve device to the brake cylinder in an emergency application of the brakes and a valve device operative upon movement of the triple valve device to one position for establishing a direct communication from the triple valve device to the brake cylinder through which fluid is supplied to the brake cylinder in an emergency application of the brakes and operative upon movement of the triple valve device to another position for cutting off said direct communication.

14. In a fluid pressure brake, the combination with a brake cylinder and a triple valve device for effecting a service application of the brakes and an emergency application of the brakes, of a valve mechanism for retarding the flow of fluid from the triple valve device to the brake cylinder in an emergency application of the brakes and a valve device positioned upon movement of the triple valve device in effecting a service application of the brakes for establishing a direct communication from the triple valve device to the brake cylinder in an emergency application of the brakes.

15. In a fluid pressure brake, the combination with a brake cylinder and a triple valve device for effecting a service application of the brakes and an emergency application of the brakes and having a position in which the release of the brakes is retarded, of a valve mechanism for retarding the flow of fluid from the triple valve device to the brake cylinder in an emergency application of the brakes and a valve device positioned upon movement of the triple valve device in effecting a service application of the brakes for establishing a direct communication from the triple valve device to the brake cylinder in an emergency application of the brakes and positioned upon movement of the triple valve device to the retarded release position for cutting off said direct communication.

16. In a fluid pressure brake, the combination with a brake pipe, brake cylinder, and triple valve device for venting fluid from the brake pipe to the brake cylinder in an emergency application of the brakes, of means movable to a position for restricting the flow of fluid from the brake pipe to the brake cylinder and a valve device controlled by said triple valve device for controlling the operation of said means.

17. In a fluid pressure brake, the combination with a brake pipe, brake cylinder, auxiliary reservoir, and a triple valve device for venting fluid from the brake pipe to the brake cylinder in an emergency application of the brakes, of means operated by fluid under pressure for restricting the flow of fluid from the brake pipe to the brake cylinder, a passageway for supplying fluid from the auxiliary reservoir to said means in an emergency application of the brakes, and a valve device controlled by the triple valve device for controlling communication through said passageway.

18. In a fluid pressure brake, the combination with a brake pipe, brake cylinder, auxiliary reservoir, and a triple valve device for venting fluid from the brake pipe to the brake cylinder in an emergency application of the brakes, of means operated by fluid under pressure for restricting the flow of fluid from the brake pipe to the brake cylinder, a passageway for supplying fluid from the auxiliary reservoir to said means in an emergency application position of the triple valve device, and a valve device controlled by said triple valve device for establishing communication through said passageway.

19. In a fluid pressure brake, the combination with a brake pipe, a brake cylinder, and a triple valve device for supplying fluid to the brake cylinder in an emergency application of the brakes, of means operative independently of the rate of reduction in brake pipe pressure for retarding the building up of brake cylinder pressure in an emergency application according to the position of the triple valve device in the train.

In testimony whereof I have hereunto set my hand.

CLYDE C. FARMER.